Patented Apr. 21, 1942

2,280,242

UNITED STATES PATENT OFFICE 2,280,242

MALEIC ANHYDRIDE-ETHYLENE GLYCOL-METHALLYL ALCOHOL RESIN

Edward L. Kropa and Theodore F. Bradley, Stamford, Conn., assignors to American Cyanamid Company, New York, N. Y., a corporation of Maine No Drawing. Application December 13, 1939, Serial No. 308,953

2 Claims. (Cl. 260—77)

This invention relates to heat- and oxygen-convertible polyester resins.

One object of the present invention is to provide polyester resins which contain many unsaturated groups. Another object is to provide polyester resins which upon polymerization are substantially infusible and substantially insoluble.

These and other objects are attained by esterifying a dicarboxylic acid with a mixture including a polyhydric alcohol and an unsaturated alcohol.

The following examples, in which the proportions are given as parts by weight, are given by way of illustration and not in limitation.

Example 1

98 parts maleic anhydride, 85 parts ethylene glycol, 200 parts ethylene chloride and 0.5 part p-toluene sulfonic acid are heated azeotropically until about 5–6 parts of water are liberated. The reaction mixture is then treated with 29 parts of methallyl alcohol and heated until no more water is evolved. The resulting resin is of a deep yellow color. In thin films catalyzed with cobalt drier, the resin converts to an insoluble film when baked in air.

Example 2

A mixture of about 50% methyl vinyl carbinol and about 50% crotyl alcohol is substituted for the methallyl alcohol in Example 1. A similar resinous material is obtained as a product.

Example 3

222 parts of phthalic anhydride, 46.5 parts of ethylene glycol and 100 parts of allyl alcohol are mixed with 250 parts of toluene and 1–2 parts of p-toluene sulfonic acid and the mixture is heated azeotropically. Water and toluene are distilled off, condensed and separated, the toluene being returned to the reaction mixture. The reaction is continued until water evolution substantially ceases. The heated mixture is then subjected to vacuum and volatile materials boiling lower than 185° C. at about 1 mm. pressure are removed, leaving a balsam-like resin of acid number about 31.

Example 4

An equivalent proportion of adipic acid is substituted for the phthalic anhydride in Example 3. A fluid resin is obtained somewhat similar to that produced according to Example 3.

Example 5

Two mols of diallyl phthalate and one mol of ethylene glycol are mixed. On heating at about 150° C., the solution becomes clear. The reaction mixture is maintained at about 150° C. in an atmosphere of carbon dioxide until the product shows substantially no difference in refractive index prior to and after being washed with water. This requires approximately seven to nine days of heating.

The following example is exemplary of one use of our unsaturated polyesters wherein two balsam-like materials are reacted to produce an infusible product without any loss of volatile matter.

Example 6

Equal weights of $\alpha$-propylene glycol maleate and allyl glycol phthalate (Example 3) are mixed with about 0.2% of benzol peroxide. Since this mixture will generally have a relatively high viscosity, it is desirable that it be milled in order to obtain good dispersion. On heating to about 120° C. for about twenty minutes a hard insoluble resinous product results.

Tertiary butyl peroxide is somewhat more easily dispersed and may advantageously be used in place of the benzoyl peroxide.

Our resins are also particularly suitable for copolymerization with other unsaturated materials such as the esters or polyesters of the $\alpha$, $\beta$-unsaturated organic acids, vinyl esters, methacrylates, etc.

Example 7

Equal parts by weight of allyl glycol phthalate (Example 3) and diethyl fumarate are mixed with about 0.2% of benzoyl peroxide and heated at about 90° C. The mixture gels in about forty minutes.

Substitution of diallyl maleate for diethyl fumarate results in gelation under similar heating treatment and a substantially infusible and insoluble product is obtained.

Dicarboxylic acids which may be used in the preparation of our polyester or alkyd resins include: phthalic, sebacic, adipic, azelaic, terephthalic, pimelic, brassylic, maleic, fumaric, itaconic, citraconic, mesaconic, aconitic, halogenated acids such as chloromaleic acid, etc. These acids may be substituted in part with acrylic, $\beta$-benzoyl acrylic, methylacrylic, $\Delta^1$-cyclohexene carboxylic, cinnamic, undecylenic and crotonic acids, as well as other monobasic acids. Obviously various mixtures of these acids can be used where expedient. The $\alpha,\beta$-unsaturated organic acids such as maleic acid are preferred inasmuch as they add unsaturation to the resin and, therefore, cause the resins to cure more readily. Obviously various mixtures of the dicarboxylic acids and with or without monocarboxylic acid may be used.

The term "acids" as used herein is intended to cover the acid anhydrides, as well as the acids themselves, since either or both may be used according to availability and convenience.

Of the polyhydric alcohols which may be used in carrying out our invention the glycols are preferred. Among these the following are included: ethylene glycol, α-propylene glycol, polyethylene glycols (e. g. diethylene glycol, triethylene glycol, tetraethylene glycol, pentaethylene glycol, hexaethylene glycol, etc.), polymethylene glycol (e. g. trimethylene glycol, decamethylene glycol, etc.), octadecandiol, 2,2-dimethylpropanedial-1,3; 1,3-butanediol; 1,2-propanediol; and 2-ethyl-2-butyl-butanediol-1,3. Glycerol or glycerol mono-ethers may also be used if desirable, as well as other polyhydric alcohols such as trimethylolpropane, nitroglycols, etc.

The unsaturated alcohols which are suitable for the purposes of our invention are the esterifiable primary and secondary alcohols which have one or more double bonds. Examples of these are allyl alcohol, methallyl alcohol (2 methyl propen-2-ol-1), methyl vinyl carbinol, crotyl alcohol, halogenated unsaturated alcohols such as 2-chlorallyl alcohol, mono-allyl and mono-methyallyl ethers of ethylene glycol, allyl carbinol, β-allyl ethyl alcohol, etc. Esters of the unsaturated alcohols may also be used, e. g. mono-allyl phthalate, mono-allyl maleate, diallyl phthalate, diallyl maleate, etc.

Various modifiers which have previously been used in alkyd resins may also be incorporated. Among these are the ordinary monobasic acids and monohydric alcohols. The addition of these alcohols or acids may serve to impart certain properties to the resinous materials which they would not otherwise have to a sufficient degree, such as the desired degrees of plasticity, flexibility, hardness, solubility, rapid air-drying properties, etc. Among the most useful of these modifiers are the fatty acids or their esters, and especially the drying oil fatty acids or the drying oils themselves. Among the drying oils (or the acids derived therefrom and the esters thereof) which may be used linseed oil, tung oil, perilla oil, oiticica oil, sunflower seed oil, etc. are included. Other fatty oils or the acids derived therefrom and the esters thereof which may be used include olein, oleic acid, stearin, stearic acid, castor oil, soya bean oil, olive oil, etc. Various mixtures of the fatty oils or fatty oil acids may be used, as well as individual fatty acids derived from the fatty oils.

Our polyesters are preferably formed by esterification under azeotropic conditions in the presence of a suitabl organic solvent (usually inert) which is preferably substantially insoluble in water but which dissolves the reactants, as well as the resulting polyester resin. Examples of these are: benzene, toluene, xylene, chloroform, carbon tetrachloride, ethylene dichloride, propylene dichloride, ethylene and propylene trichlorides, butylene di- and trichlorides, cresols, cyclohexanone, methyl cyclohexanone, etc. The range of preferred concentration for the inert organic solvent is from about 25% to about 50% of the total weight of the reactants and organic solvent. It is also possible but not generally desirable to use a large excess of the unsaturated monohydric alcohol which is to be used as a reactant, e. g. allyl alcohol, in place of or in addition to the inert organic solvent.

It is preferable that a suitable esterification catalyst be employed, examples of which are: p-toluene sulfonic acid, thymol sulfonic acid, d-camphor sulfonic acid, stannic chloride, stannic chloride dioxanate, etc. Only a small proportion of catalyst is generally sufficient e. g. about 1%-3% of the weight of acid reacted.

The esterification reaction is preferably carried out in a suitable reaction chamber which is provided with an agitator, a reflux condenser and preferably a trap for separating and removing the water formed during the esterification together with means for returning the essentially non-aqueous fraction of the distillate to the reaction chamber after condensation. It is also advantageous to carry out the reaction under an inert atmosphere such as nitrogen or carbon dioxide. The reaction temperature is preferably controlled so that no local overheating will occur. The reaction temperature will depend upon the inert organic solvent employed, if any be used, and upon the concentration of such solvent, as well as the concentration of the reactants. Generally the reaction temperature should range between about 90°–200° C.

If unsaturated alcohols having branched chains or containing other than terminal double bonds be used, it is desirable that the polyhydric alcohol and dibasic acid be esterified at least partially before introducing the unsaturated alcohol into the reaction mixture. The purpose of this procedure is to minimize any tendency to gel which might be present if all of the reactants be esterified simultaneously. This same procedure may be used with any of the other unsaturated alcohols which show a tendency to gel when reacted with unesterified dibasic acid.

The esterification reaction is continued until the acid number of the polyester resin being formed is sufficiently low. The inert solvent and/or excess unsaturated alcohol are removed by distillation and the ester of the unsaturated alcohol (which is formed along with the polyester resin) is distilled off under vacuum, e. g. at about 1–10 mm. of mercury absolute pressure. The residue comprises the polyester resin product.

In order to accelerate polymerization of our polyesters, polymerization catalysts may be incorporated in our materials before polymerization. The organic superoxides, aldehydic and acidic peroxides are suitable for this purpose. Among the preferred catalysts there are: the acidic peroxides e. g. benzoyl peroxide, phthalic peroxide, succinic peroxide and benzoyl acidic peroxide; fatty oil acid peroxides e. g. lauroyl or cocoanut oil acid peroxides and oleic peroxide; alcohol peroxides e. g. tertiary butyl peroxide and terpene oxides e. g. ascaridole. Still other polymerization catalysts may be used in some instances such as soluble cobalt salts (particularly the linoleate and naphthenate), p-toluene sulfonic acid, aluminum chloride, stannic chloride and boron trifluoride. In many instances it may be desirable to use a mixture of these catalysts e. g. benzoyl peroxide with a cobalt salt.

The concentration of polymerization catalyst employed is usually small, i. e. for the preferred catalysts, from about 0.1% to about 2% of the polyester. If a polymerization inhibitor be present, up to 5% or even more of catalyst may be necessary according to the concentration of inhibitor. Where fillers are used which contain high concentrations of substances which act as inhibitors, e. g. wood flour, the concentration of catalyst necessary to effect polymerization may be well above 5%.

Our polyester resins may be mixed with one or more of the various fillers e. g. wood flour, wood fiber, paper dust, clay, zein, glass wool, mica, granite dust, asbestos, casein, silk flock, cotton flock, steel wool, carborundum, paper, cloth, sand, white, black or colored pigments, etc. Furthermore, suitable dyes may also be used for coloring purposes if desirable. Compatible natural and synthetic resins may also be admixed with our new resinous materials, e. g. shellac, cellulose esters and ethers, urea-aldehyde resins, triazine-aldehyde resins such as melamine formaldehyde resin, phenolaldehyde resins, alkyd resins, ester gum, rubber, synthetic rubber-like products, rubber compounds, etc.

In some instances it may be desirable to include a polymerization inhibitor in our polyester resinous compositions in order to improve the stability during storage or to control the reaction velocity during polymerization. Phenolic compounds, especially the polyhydric phenols and the aromatic amines act as polymerization inhibitors. Specific examples of this group of inhibitors are hydroquinone, resorcinol, tannin, sym. di-beta-naphthyl-p-phenylene diamine

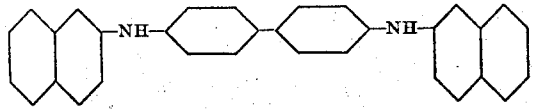

and phenolic resins. Sulfur compounds are also suitable. Among the more preferred examples are benzaldehyde and l-ascorbic acid.

The concentration of the inhibitor is preferably low and usually less than 1% is sufficient. With the preferred inhibitors only about 0.01% to about 0.1% is sufficient.

Resinous materials made according to our invention have a wide variety of uses as in coating compositions and in molding compositions. Our resins are particularly suitable for the production of laminated paper or cloth materials used in the production of electrical insulation, gear wheels, abrasive wheels or disks, brake linings and various other molded objects. Coating compositions containing these resins are valuable for coating metallic receptacles such as beverage and food containers, for treating cloth or paper to render the same resistant to moisture or chemical action, the resulting products being suitable for shower curtain cloth, tobacco pouches, electrical insulating cloth, etc. Coating compositions containing our resins may also be used in a wide variety of lacquers, varnishes, enamels and paints. Our resins are also useful in the production of gaskets and in the manufacture of printing inks.

Our polyesters may be polymerized at room temperature, although it is generally desirable to utilize elevated temperatures. Generally if the compositions contain catalysts, temperatures between about 100° C. and about 165° C. are suitable. It may be desirable to partially cure our polyesters in some applications at somewhat lower temperatures, e. g. 50°–80° C. but in order to effect the final cure more rapidly temperatures between about 135°–165° C. are desirable. The optimum range of polymerization temperatures obviously will vary for each polyester, as well as with the type of application, i. e. molding, casting, laminating, surface coating, etc. Polymerization or curing our polyesters in an inert atmosphere has been found to be advantageous in some instances.

The rate of polymerization of our polyesters is accelerated when they are subjected to ultraviolet light, infra-red and other light radiations. They may be heated simultaneously with the light radiation to further increase the rate of polymerization.

Obviously many modifications and variations in the processes and compositions described herein may be made without departing from the spirit and scope of the invention as defined in the appended claims.

We claim:
1. A process which comprises partially esterifying 98 parts of maleic anhydride with 85 parts of ethylene glycol and esterifying the resulting product with 29 parts of methallyl alcohol to produce a resinous product.
2. A resin produced by the process of claim 1.

EDWARD L. KROPA.
THEODORE F. BRADLEY.